United States Patent Office 3,477,903
Patented Nov. 11, 1969

3,477,903
ADHESIVE LAMINATION OF CELLULOSIC SUBSTRATES
Theodore S. Semegran, Piscataway, N.J., and Paul C. Trubiano, New York, N.Y., assignors to National Starch and Chemical Corporation, New York, N.Y., a corporation of Delaware
No Drawing. Filed Dec. 2, 1964, Ser. No. 415,511
Int. Cl. C09j *3/06;* B32b *29/00*
U.S. Cl. 161—266                                3 Claims

ABSTRACT OF THE DISCLOSURE

A laminate comprising at least two laminae, one of which is a cellulosic substrate selected from the group consisting of paper and paperboard; said laminae being bonded to one another by means of an adhesive composition characterized by its excellent water resistance and comprising a mixture, in an aqueous medium, of an amylose product containing at least 55%, by weight, of amylose and a peptizing agent selected from the group consisting of alkali metal hydroxides, alkali metal salts, salts of alkaline-earth metals, salts of transition elements, sodium salicylate and formaldehyde.

---

This invention relates to the adhesive lamination of cellulosic substrates which results in adhesive bonds characterized by their exceptional water resistance. It also relates to the novel adhesive compositions which are used in preparing such laminates.

Processes involving the lamination of cellulosic substrates are encountered in a wide range of industrial applications. These include, for example, the fields of spiral, convolute and composite tube winding, case sealing, bottle labeling, carton sealing, solid fiber laminating, as in the case of fiber board, paper box and paper bag production and the lamination of paper and foil surfaces, as in the production of paperboard. The adhesives used in the production of such laminates are required to be fluid and rapid setting while the bonds formed, therewith, should exhibit strong tack, i.e. form a strong bond immediately after the adhesive and the adherent are brought into contact under low pressure, and strong fiber tear, i.e. the actual physical tearing of one or more of the individual cellulosic substrates which comprise a laminate when an attempt is made to effect its delamination.

It is often essential that the adhesive bonds of cellulosic substrates possess an additional property; namely that of water resistance. This property is required in the adhesive bonds of cellulosic laminates which are exposed to moisture in ordinary usage or are exposed to the excessive moisture and varying temperature conditions encountered during outdoor exposure.

Starch adhesives, comprising aqueous dispersions of starches and their derivatives, are widely used for the lamination of cellulosic substrates, yet the bonds derived from such adhesives are inherently poor with respect to their water resistance. Attempts to increase the water resistance of starch adhesives have centered on the addition of resin-catalyst systems to the aqueous dispersions. Although such additives have vastly improved the water resistance of the resulting bonds, their use has in turn created other problems relating to economy, pot life, flow properties, machine speeds, etc.

Thus, for example, one such method which has been utilized in an attempt to provide water resistant starch adhesives has involved the admixture of starch with ureaformaldehyde resins, using acid catalysts such as alum, ammonium chloride and ammonium sulfate. The resin reacts with the starch in a cross-linking reaction, thereby preventing it from softening in water. Such compositions must, however, be prepared at a pH of less than 5 in order to enable the resin to perform the desired cross-linking reaction. Unfortunately, this need for low pH imparts poor flow properties to the resulting adhesive compositions thus resulting in greatly reduced machine speeds, corrosion of the glue rolls and prevention of the development of many desirable paste characteristics such as tackiness, viscosity, rapid rate of setting and other essential properties. Poor pot life and difficult to control cross-linking reactions also accompany the use of such acidic resin systems.

In another technique, the starch is cooked under alkaline conditions with resins which set or harden at a pH of above 7. Although the bonds prepared from these adhesives are water resistant, on exposure to wet weather conditions they nevertheless tend to delaminate.

Still another approach to the problem employs resorcinol, or other phenols, in combination with formaldehyde as additives for the starch. This latter system similarly suffers from serious drawbacks. These adhesives have a very short pot life at the pH range most useful for maximum production speeds since, as it is well known in the art, a reduction in the machine speed is usually required in order to allow the starch to gelatinize in situ on the acid side. Another shortcoming of these additives is the slow rate of bond formation which results from their relatively low pH.

The use of resorcinol-formaldehyde additives in starch based adhesives is also accompanied by other disadvantages. Thus, cellulosic laminates bonded with these starch adhesives cannot be repulped. In addition, these adhesives possess the disadvantage of having a dark color, thereby limiting the applications in which they may be utilized.

It is the prime object of this invention to produce laminated cellulosic substrates whose adhesive bonds are characterized by optimum water resistance as hereinafter defined. It is a further object of this invention to produce adhesive compositions which are rapid setting and which yield bonds that exhibit optimum water resistance, good tack and strong fiber tear. Another object of this invention is to increase the efficiency, simplicity and economy of the laminating process employing such adhesive compositions.

It is well known that starch is composed of two fractions, the molecular arrangement of one being linear and that of the other being branched. The linear fraction of starch is known as amylose and the branched fraction as amylopectin. Methods for separating starch into these components are known. Starches from different sources (i.e. potato, corn, rice, wheat, etc.) are characterized by different relative proportions of the amylose and amylopectin components. Ordinary starches contain from about 17% to 34%, by weight, of the amylose fraction. Some starches have been genetically developed which are characterized by a large preponderance of the one fraction over the other.

When we use the terms "amylose" or "amylose product" for the purposes of this invention, we refer to the amylose resulting from the separation of the amylose and amylopectin components of whole starch as well as to whole starch which is composed of at least 55%, by weight, amylose. The amylose may be further treated, as with heat and/or acids or with oxidizing agents to form so called thin boiling products. The amylose may also be chemically derivatized, as by means of an esterification reaction which would thus yield amylose esters such, for example, as the acetate, propionate and butyrate; or by means of an etherification reaction which would thus yield amylose ethers such, for example, as the hydroxyethyl, carboxymethyl or benzyl.

We have now discovered adhesive systems capable of yielding exceedingly high water resistant bonds; these novel systems being produced by dispersing amylose, as herein defined, with peptizing agents. We have further discovered that these water resistant adhesive compositions possess properties which make them remarkably well-suited for use in the lamination of cellulosic substrates.

As has been noted hereinabove, the use of most of the prior art processes for preparing starch adhesives capable of producing water resistant bonds, is accompanied by a variety of undesirable effects. The latter have included poor pot life, reduced machine speeds, short term water resistance, unworkable viscosity, high cost, etc. Such prior art processes are usually characterized by the admixture of certain chemical agents and catalysts with conventional, i.e. low amylose, starch. In many instances the application of heat is also necessary.

It is to be emphasized here that the preparation of our novel adhesive compositions is devoid of all of the above noted inconveniences of the prior art techniques, while the resulting products are entirely free of the many undesirable properties which were present in the compositions derived from the latter prior art methods. Thus, the addition of peptizing agents to an amylose product produces smooth and readily workable adhesive masses. This is in contrast with any attempt to use such agents with most forms of conventional, i.e. low amylose, starches, in which case one obtains jelly-like products whose poor viscosity characteristics prevents their ready utilization on the commercial apparatus utilized in the lamination of cellulosic substrates.

The formulation of these novel adhesives requires neither the use of catalysts nor the inclusion of expensive chemical agents. The application of heat is not essential since most of the ingredients readily combine under room temperature conditions. The excellent tack and rapid setting speed of the resulting adhesives, along with the prolonged water resistance characterized by minimum ply separation and excellent fiber tear of the bonds thus formed, indicates the versatility of these systems when used in the lamination of cellulosic substrates.

For the purposes of this invention, the term "peptizing agent" includes alkali metal hydroxides such as sodium hydroxide, potassium hydroxide and lithium hydroxide; alkali metal salts such as the sodium, potassium and lithium halides, the sodium, potassium and lithium nitrates, the sodium, potassium and lithium thiocyanates; salts of the alkaline-earth metals such as the magnesium, barium and calcium halides, the magnesium, barium and calcium nitrates, the magnesium, barium and calcium thiocyanates; transition element salts such as the zinc halides and nitrates; and, organic peptizing agents such, for example, as formaldehyde, thiourea, sodium salicylate, resorcinol and chloral hydrate. It is to be emphasized that based on performance, the alkali metal hydroxides, as described above, are the preferred peptizing agents for use in the process of this invention.

In general, the procedure used for preparing the amylose adhesives of this invention begins with the addition, under agitation, of the selected amylose product to water which is at a temperautre of about 22° C. To the latter aqueous amylose suspension there is then added, with agitation, an aqueous solution of the selected peptizing agent; the latter solution containing from about 1 to 100%, by weight, of the peptizing agent. The solution of the peptizing agent may be heated to a temperature of from about 25 to 100° C., before its addition to the amylose, in order to effect complete solution of the more difficulty soluble peptizing agents. The resulting mixture is maintained, with agitation, at a temperature of from about 20 to 100° C. for a period of ¼ to 1 hour, but preferably for a period of ½ hour, thereby completing its preparation. However, when alkali metal hydroxides are employed as the peptizing agents, the system is preferably maintained at a temperature of about 22° C. during the entire period of preparation. The resulting product is, in all cases, ready for immediate utilization or, if desired, may be stored and then used as long as about four weeks subsequent to its preparation. It should be noted, however, that the higher the temperature to which the adhesive is subjected during its preparation period, the shorter will be its subsequent period of usefulness.

With respect to other proportions, the amylose should be present in a concentration amounting to from about 2% to 60%, by weight, of the total composition, i.e. water plus solids. Water should be present in the amylose dispersion in a concentration amounting to from about 30% to 98%, by weight, of the total weight, i.e. water plus solids. The final composition should contain from about 1% to 300% of the selected peptizing agent, as based on the weight of amylose present therein.

These novel adhesives may be utilized for the lamination of a wide variety of cellulosic substrates such, for example, as paper and paperboard as well as for the lamination of cellulosic substrates to non-cellulosic substrates such, for example, as metallic foils. The actual application of these adhesive compositions may be accomplished by the use of any technique which is capable of depositing a continuous adhesive film on the surface of the respective substrates. Thus, among the various methods of application which may be utilized, one may list wire wound and grooved rod applicators, as well as air knife, trailing blade, roll brush and curtain coaters. These compositions may be deposited in a coating having no more than about a 20 mil wet film thickness.

Following their application, the resulting adhesive films are then dried by any convenient means as, for example, by air drying or by the use of forced air oven drying, infra-red or radiant heat drying. Here again, such drying methods are well known and the practitioner may employ the drying means best suited to his particular needs in light of the equipment which is available.

In order to demonstrate the superior water resistance of the adhesive bonds produced in laminates of cellulosic substrates which are prepared by means of the process of this invention, the tests described, hereinbelow, may be utilized.

The laminations are first immersed, for 24 hours, in water which is at a temperature of about 22° C. Ply separation and fiber tests are then run on the thus soaked laminations. The testing procedures follow:

(a) Ply separation

Ply separation is determined by flexing the edges of the laminate by pressure of the thumb, the pressure applied being sufficient only to overcome the surface tension of the water. Under these conditions, separation of the individual lamina should not extend more than ¼ of an inch from the edge of the test specimen.

(b) Fiber tear

In the above described ply separation test, shearing of the individual lamina or separation of the fibers therein, was not considered to be ply separation. However, after physical delamination, the samples are examined for the purpose of determining the degree of fiber tear relative to the total area of the adhesive bond. This result is then expressed as percent fiber tear.

It may also be noted, at this point, that the amylose adhesive systems of this invention may be extended with various fillers such as clays, salts and other materials. It is essential, however, that where alkali-metal hydroxides are employed as peptizing agents, the addition of these fillers should not alter the alkaline condition of the resulting adhesive system. Various representative fillers which may be incorporated in the adhesive compositions are: aluminum silicate pigments, attapulgus clays, bentonite clays, diatomaceous earths, calcium carbonate, magnesium carbonate, asbestos, and wood based fillers, These fillers may be present in the adhesive systems of this invention, in maximum concentrations of about 300%, as based on the weight of amylose present therein.

The following examples will more fully illustrate the embodiment of this invention. In these examples all parts given are by weight unless otherwise noted.

EXAMPLE I

This example illustrates the preparation of the novel adhesives of this invention using, in this instance, the amylose resulting from the fractionation of the amylose and amylopectin components of whole potato starch. It further illustrates the excellent water resistance characterized herein as "optimum water resistance" of the adhesive bonds which are obtained when the adhesives are used to effect the lamination of cellulosic substrates.

The following ingredients were charged into a vessel equipped with means for mechanical agitation:

| | Parts |
|---|---|
| Water | 100.0 |
| Amylose | 20.0 |

With constant agitation, the amylose was added to the water which was at a temperature of about 22° C. To the above mixture, 10.0 parts of a 25%, by weight, aqueous solution of sodium hydroxide was then added and the resulting mixture was then stirred for ½ hour with moderate agitation. It was noted that the amylose swelled and built up viscosity on addition of the aqueous sodium hydroxide solution.

A two-ply laminate of 42# kraft stock was then prepared by applying a one mil wet film of the above described adhesive to a surface of one of the plies or substrates. The second ply of kraft was placed in face to face contact with the adhesive coated lamina and the resulting laminate was then air dried for a period of three days. The dried laminate was then immersed in water, which was at a temperature of 22° C., for a 24 hour period.

After removal of the immersed laminate, the ply separation and fiber tear tests, as previously described, were performed and it was found that optimum water resistance was achieved, i.e. the laminate was devoid of ply separation and yielded a fiber tear of substantially 100%.

The above described procedure was then repeated under identical conditions with the exception that potassium hydroxide and lithium hydroxide were respectively utilized as the peptizing agents in place of sodium hydroxide. By means of these procedures, the characteristics of the laminates and bonds thus formed were comparable to those obtained with the sodium hydroxide peptized amylose.

EXAMPLE II

This example illustrates the preparation of the novel adhesives of this invention using, in this instance, high amylose corn starches. It further illustrates the high degree of water resistance on the part of the adhesive bonds which are obtained when these adhesives are used to effect the lamination of cellulosic substrates.

The procedures used to prepare and test the adhesive formulations of this example, as described below, were identical to the procedures as set forth in Example I.

| | Parts | |
|---|---|---|
| | Formulation 1 | Formulation 2 |
| Water | 100.0 | 100.0 |
| High amylose corn starch (70% by weight amylose) | 20.0 | |
| High amylose corn starch (55% by weight amylose) | | 20.0 |
| 25% by weight aqueous NaOH solution | 10.0 | 10.0 |

The resulting laminates prepared, hereinabove, with the use of each of the above described formulations exhibited optimum water resistance, i.e. the laminate did not exhibit any ply separation and gave a fiber tear of substantially 100%.

EXAMPLE III

This example illustrates the preparation of the novel adhesives of this invention using, in this instance, a salt of an alkali metal as the peptizing agent. It further illustrates the high degree of water resistance on the part of the adhesive bonds which are obtained when these adhesives are used to effect the lamination of cellulosic substrates.

The procedures used to prepare and test the adhesive formulations of this example, as described below, were identical to the procedures as set forth in Example I, with the exception that the resulting adhesive system was heated to 88° C. and maintained, with agitation, at that temperature for ½ hour.

| | Parts | | |
|---|---|---|---|
| | #1 | #2 | #3 |
| Water | 75.0 | 75.0 | 75.0 |
| Amylose (derived from fractionation of potato starch) | 12.5 | | |
| High amylose corn starch (70.0% by weight amylose) | | 12.5 | |
| High amylose corn starch (55.0% by weight amylose) | | | 12.5 |
| Potassium bromide | 12.5 | 12.5 | 12.5 |

The adhesive bonds of the laminates prepared with the use of each of the above described formulations exhibited optimum water resistance.

EXAMPLE IV

This example illustrates the preparation of the novel adhesives of this invention using, in this instance, a salt of an alkaline-earth metal as the peptizing agent. It further illustrates the high degree of water resistance on the part of the adhesive bonds which are obtained when these adheives are used to effect the lamination of cellulosic substrates.

The procedures used to prepare and test the adhesive formations of this example, as described below, were identical to the procedures as set forth in Example I, with the exeception that the resulting adhesive system was heated to 88° C. and maintained, with agitation, at that temperature for ½ hour.

| | Parts | | |
|---|---|---|---|
| | #1 | #2 | #3 |
| Water | 75.0 | 75.0 | 75.0 |
| Amylose (derived from the fractionation of potato starch) | 12.5 | | |
| High amylose corn starch (70.0% by weight amylose) | | 12.5 | |
| High amylose corn starch (55.0% by weight amylose) | | | 12.5 |
| Barium chloride | 12.5 | 12.5 | 12.5 |

The adhesive bonds of the laminates perpared with the use of each of the above described formulations exhibited optimum water resistance.

EXAMPLE V

This example illustrates the preparation of the novel adhesives of this invention using, in this instance, a salt of a transition element as a peptizing agent. It further illustrates the high degree of water resistance on the part of the adhesive bonds which are obtained when these adhesives are used to effect the lamination of cellulosic substrates.

The procedures used to prepare and test the adhesive formulations of this example, as described below, were identical to the procedures as set forth in Example I, with the exception that the resulting adhesive system was heated to 90° C. and maintained, with agitation, at that temperature for ½ hour.

|  | Parts | | |
| --- | --- | --- | --- |
|  | #1 | #2 | #3 |
| Water | 75.0 | 75.0 | 75.0 |
| Amylose (derived from the fractionation of potato starch) | 12.5 | | |
| High amylose corn starch (70.0% by weight amylose) | | 12.5 | |
| High amylose corn starch (55.0% by weight amylose) | | | 12.5 |
| Zinc nitrate | 12.5 | 12.5 | 12.5 |

The adhesive bonds of the laminates prepared with the use of each of the above described formulations exhibited good to excellent water resistance.

EXAMPLE VI

This example illustrates the preparation of novel adhesives of this invention using, in this instance, an organic peptizing agent. It further illustrates the high degree of water resistance on the part of the adhesive bonds which are obtained when these adhesives are used to effect the lamination of cellulosic substrates.

The procedure used to prepare and test the adhesive formulations of this example, as described below, were identical to the procedures as set forth in Example I, with the exception that the resulting adhesive systems of formulations #1, #2 and #3 were heated to 88° C. and maintained, with agitation, at that temperature for ½ hour.

|  | Parts | | | | | |
| --- | --- | --- | --- | --- | --- | --- |
|  | #1 | #2 | #3 | #4 | #5 | #6 |
| Water | 75.0 | 75.0 | 75.0 | 75.0 | 75.0 | 75.0 |
| Amylose (derived from the fracionation of potato starch) | 16.5 | | | 16.5 | | |
| High amylose corn starch (70.0%, by weight, amylose) | | 16.5 | | | 16.5 | |
| High amylose corn starch (55.0%, by weight, amylose) | | | 16.5 | | | 16.5 |
| Sodium salicylate | 8.5 | 8.5 | 8.5 | | | |
| Formaldehyde | | | | 8.5 | 8.5 | 8.5 |

The adhesive bonds of the laminates prepared with the use of each of the above described formulations exhibited optimum water resistance.

EXAMPLE VII

This example illustrates the poor water resistance on the part of the adhesive bonds obtained in laminates of cellulosic substrates prepared with conventional, i.e. low amylose, corn starch.

The formulation tested is set forth in the table appearing below:

|  | Parts |
| --- | --- |
| Water | 100.0 |
| Corn starch (27%, by weight, amylose) | 20.0 |
| 25%, by weight, aqueous NaOH solution | 10.0 |

The procedure used to prepare the adhesive of the above formulation was identical to the procedure as set forth in Example I, hereinabove. In contrast to the smooth and workable adhesives prepared from the amylose systems of this invention, these formulations exhibited high gel characteristics and an exceedingly high viscosity. However, although the adhesive produced from the above formulation could not be considered commercially operable, it was nonetheless adapted for use in effecting the lamination of cellulosic substrates. It was thus possible to present a complete comparison of the water resistance of the adhesive bonds obtained with a low amylose starch based system as contrasted with the bonds obtained in a laminate prepared using an adhesive formulation as taught by the process of this invention as set forth in Example I, hereinabove.

The procedure, whereby the above adhesive formulation was used to effect a lamination of cellulosic substrates, was identical to the procedure as set forth in Example I, hereinabove. Thus, after the laminate prepared with this conventional, low amylose starch had been removed from the water bath, a complete lack of water resistance on the part of its adhesive bonds was readily evidenced by the complete ply separation and total absence of fiber tear.

EXAMPLE VIII

This example illustrates the addition of a filler to the novel amylose based adhesive of this invention. It further illustrates the retention of the high degree of water resistance on the part of the adhesive bonds which are obtained when such an extended adhesive is used to effect the lamination of cellulosic substrates.

The following ingredients were charged into a vessel equipped with means for mechanical agitation:

|  | Parts |
| --- | --- |
| Water | 100.0 |
| High amylose corn starch (70%, by weight, amylose) | 20.0 |
| Kaolin clay | 10.0 |

While the above mix was being stirred at a temperature of 22° C., 12.0 parts of a 25%, by weight, aqueous solution of sodium hydroxide was added and the resulting mixture was then stirred for an additional ½ hour with moderate agitation. It was noted that the amylose swelled and built up viscosity on addition of the aqueous sodium hydroxide solution.

A two-ply laminate of 42# kraft stock was then prepared by applying a one mil wet film of the above described adhesive to a surface of one of the substrates. The second sheet of kraft was placed in face to face contact with the adhesive coated lamina and the resulting laminate was then air dried for a period of two days. The dried laminate was then immersed in water, which was at a temperature of 22° C., for a 24-hour period.

After removal of the immersed laminate, the ply separation and fiber tear tests, as previously described, were performed and it was found that the laminate was devoid of ply separation and yielded a fiber tear of substantially 100%.

Essentially, it will thus be seen that this invention provides for the lamination of cellulosic substrates using adhesives yielding bonds which exhibit optimum water resistance. By "optimum water resistance" as used herein and in the claims hereof is meant a water resistance such that when a laminate comprising two laminae, one of which is a cellulosic substrate, is bonded with a dried film of the adhesive and the laminate is immersed in water, the laminate will not exhibit any ply or laminae separation and will yield a fiber tear of substantially 100%.

Variations may be made in proportions, procedures and materials without departing from the scope of this invention as defined by the following claims.

We claim:

1. A laminate comprising at least two laminae, one of which is a cellulosic substrate selected from the group consisting of paper and paperboard, said laminae being adhesively bonded with a dried adhesive film exhibiting optimum water resistance after immersion of the laminate in water, said adhesive film when applied to the cellulosic substrate comprising the mixture in an aqueous medium of an amylose product containing at least 55%, by weight, of amylose and (a) an extraneously added peptizing agent.

2. The laminate of claim 1, in which said peptizing agent is selected from the group consisting of alkali metal hydroxides, alkali metal salts, salts of alkaline-earth metals, salts of transition elements, sodium salicylate and formaldehyde.

3. The laminate of claim 2, wherein the peptizing agent is present in a concentration of from about 1% to 300%, by weight, as based on the weight of amylose present therein.

References Cited
UNITED STATES PATENTS

| | | | |
|---|---|---|---|
| 2,779,693 | 1/1957 | Pacsu et al. | 106—210 |
| 2,892,731 | 6/1959 | Claxton | 106—214 |
| 2,974,049 | 3/1961 | Frieders | 106—214 |
| 3,051,700 | 8/1962 | Elizer et al. | 106—210 |
| 3,220,731 | 11/1965 | Germino et al. | 106—210 |

MORRIS SUSSMAN, Primary Examiner

U.S. Cl. X.R.

105—210; 127—32